United States Patent
Wu et al.

(10) Patent No.: US 9,706,096 B2
(45) Date of Patent: Jul. 11, 2017

(54) METHOD FOR TAKING PHOTO WITH EXTENSION FLASH MODULE OF MOBILE DEVICE

(71) Applicant: EOSMEM CORP., Zhubei, Hsinchu County (TW)

(72) Inventors: Ying-Yi Wu, Zhubei (TW); Rong-Jie Tu, Zhubei (TW)

(73) Assignee: EOSMEM CORP., Zhubei, Hsinchu County (TW)

( * ) Notice: Subject to any disclaimer, the term of this patent is extended or adjusted under 35 U.S.C. 154(b) by 0 days.

(21) Appl. No.: 14/643,905

(22) Filed: Mar. 10, 2015

(65) Prior Publication Data
US 2016/0142600 A1   May 19, 2016

(30) Foreign Application Priority Data
Nov. 19, 2014   (TW) .............. 103140180 A

(51) Int. Cl.
*H04N 5/225*   (2006.01)
*H04N 5/235*   (2006.01)

(52) U.S. Cl.
CPC ......... *H04N 5/2256* (2013.01); *H04N 5/2354* (2013.01)

(58) Field of Classification Search
CPC ................... H04N 5/2256; H04N 5/2354
USPC ..................................................... 348/371
See application file for complete search history.

(56) References Cited

U.S. PATENT DOCUMENTS

| 2005/0157207 | A1* | 7/2005 | Voss ................. | H04N 5/232 348/371 |
| 2006/0284996 | A1* | 12/2006 | Kanai ................ | H04N 5/232 348/294 |
| 2011/0317991 | A1* | 12/2011 | Tsai ................... | G03B 9/70 396/180 |
| 2013/0076952 | A1* | 3/2013 | Shi .................... | H04N 5/2354 348/308 |

* cited by examiner

*Primary Examiner* — Lin Ye
*Assistant Examiner* — Chan Nguyen
(74) *Attorney, Agent, or Firm* — Muncy, Geissler, Olds & Lowe, P.C.

(57) ABSTRACT

A method for taking photo with an extension flash module of a mobile device is provided in the present invention. The mobile device operates in coordination with an extension flash module to achieve fill light while taking photo. The method includes the following steps: detecting a specific event before a flashable period. The flashable period starts from the time at which a last row of photo sensors begins exposure to the time at which a first row of photo sensors ends exposure. The time at which the specific event occurs is a fixed period of time compared to the flashable time. Then, triggering a flash instruction according to a flash delay time and a period from the time at which the specific event occurs to the flashable time, such that the extension flash module flashes during the flashable time.

10 Claims, 5 Drawing Sheets

METHOD FOR TAKING PHOTO WITH EXTENSION FLASH MODULE OF MOBILE DEVICE

BACKGROUND OF THE INVENTION

Field of Invention

The present invention relates in general to the technology of flash lamp, and more particularly to a method for taking photos suitable for an extension flash module of a mobile device.

Related Art

With continuous advance in pixels and quality of digital photography, it has become a trend for mobile devices, such as mobile phones and tablets, to carry the function of taking photos. However, these built-in digital cameras have not been able to perform as well as conventional digital cameras under the circumstances of low lighting or backlighting.

Although some built-in digital cameras also carry light-emitting diode (LED) supplement lamp, both the battery capacity of mobile devices and the heat dissipation issue of LEDs seriously confine the volume of fill light provided by LED supplement lamp. When the distance between the object being photographed and the LED supplement lamp exceeds one meter, the LED fill light cannot provide adequate light source to allow photo sensors to be properly exposed.

Xenon high-intensity discharge lamps (HIDs) can provide a large amount of supplementary lighting within a short period of time. Therefore, conventional digital cameras usually carry xenon HID. A charger in a xenon HID converts low-voltage battery power supply into high-voltage power supply and stores it in a high-volume high-voltage capacitor. Operating in coordination with a mechanical shutter, the xenon HID is then triggered at a proper time to convert the electricity stored in the high-voltage capacitor into high-brightness supplementary lighting within a very short period of time so that photo sensors are properly exposed under circumstances of low lighting or backlighting. A xenon HID requires a high-voltage capacitor having a capacitance from dozens to hundreds of μF and able to withstand 300 to 400 volts. In pursuit of lighter, thinner and more compact mobile devices, the very large volume of the capacitor fails to meet the requirements of current mobile devices. Therefore, without increasing the volume and weight of existing mobile devices, extension HID flash modules become a feasible and necessary option.

According to the specifications of the capacitance in high-voltage capacitors and HID lamp tubes, the flash time of HID flash modules lasts from dozens to hundreds of microseconds (μs). How to flash at the right time so that all photo sensors are evenly exposed is another important issue to be solved as to whether extension HID flash modules are a feasible option. Mobile devices which carry a photo-taking apparatus normally adopt complementary metal-oxide semiconductor (CMOS) photo sensors and a rolling shutter instead of a mechanical shutter, as shown in FIG. 1. FIG. 1 depicts a schematic drawing of a rolling shutter in the conventional art. In FIG. 1, every line represents the time during which every line in the photo sensor performs light-sensing operation. Although the length of exposure for every row of photo sensors in a frame is the same, there is a delay between the time when a row of photo sensors begins or ends exposure and the time when its preceding row of photo sensors begins or ends exposure. During the delay time, the photo-taking apparatus reads the exposure data in the photo sensors and completes resetting so as to proceed with the exposure in the next frame. Since photos are taken in different environments and photo-taking apparatuses are also set differently, the exposure time of every row of photo sensors lasts approximately from a few milliseconds to hundreds of milliseconds.

However, due to the limitations of rolling shutters, extension HID flash modules usually fail to locate the optimal flash time and cannot improve the quality of photos.

SUMMARY OF THE INVENTION

An objective of the present invention is to provide a method for taking photos suitable for an extension flash module of a mobile device. The extension flash module is electrically or mechanically coupled to the mobile device, or it is coupled to the mobile device through light or sound. The method provided by the present invention determines a right flash time so that the extension flash module flashes at the right time, thereby enhancing the quality of photos taken by the mobile device.

In order to achieve said objective and others, the present invention provides a method for taking photos suitable for a mobile device. The mobile device operates in coordination with an extension flash module to achieve fill light. The method includes the following steps: detecting a specific event before a flashable time. The flashable time refers to a period from the time at which the last row of photo sensors begins exposure of a specific frame to the time at which the first row of photo sensors ends exposure of the specific frame. The specific event occurs for a relatively fixed length of time compared to the flashable time. According to a flash delay time and the period from the specific event to the flashable time, a flash instruction is triggered so that the extension flash module flashes during the flashable time.

In accordance with the exemplary embodiments of the present invention, the specific event includes the time at which the first row of photo sensors begins exposure. The fixed length of time refers to the period from the time at which the first row of photo sensors begins exposure to the time at which the last row of photo sensors begins exposure. In another embodiment, the specific event includes the time at which the $K^{th}$ row of photo sensors begins exposure. The fixed length of time refers to the period from the time at which the $K^{th}$ row of photo sensors begins exposure to the time at which the last row of photo sensors begins exposure. In another embodiment, the specific event includes the $K^{th}$ row of photo sensors of the first N frames in the specific frame begins exposure. The fixed length of time is N frame times plus the period from the time at which the $K^{th}$ row of photo sensors begins exposure to the time at which the last row of photo sensors begins exposure. In another embodiment, the specific event includes the time at which the $K^{th}$ row of photo sensors of the first N frames in the specific frame ends exposure. The fixed length of time is N−1 frame times plus the period from the time at which the $K^{th}$ row of photo sensors begins exposure to the time at which the last row of photo sensors begins exposure. In still another embodiment, the specific event includes the time at which the $K^{th}$ row of photo sensors of the first N frames in the specific frame begins exposure. The fixed length of time is N−1 frame times plus the period from the time at which the $K^{th}$ row of photo sensors ends exposure to the time at which the last row of photo sensors begins exposure, and N, K are both natural numbers.

The spirit of the present invention is to use a specific event; the time at which the specific event occurs is relatively fixed and known compared to the flashable time.

Meanwhile, the delay time of the flash module is also coordinated to trigger the flash module so that the flash module flashes during the flashable time. Therefore, with the method for taking photos provided by the present invention, photo sensors are properly exposed under the circumstances of low lighting or backlighting, thereby enhancing the quality of photos taken by the mobile device.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The present invention will be apparent from the following detailed description, which proceeds with reference to the accompanying drawings, wherein the same references relate to the same elements.

The present invention will become more fully understood from the detailed description given hereinafter and the accompanying drawings are given by way of illustration only, and thus are not limitative of the present invention.

Figure 1:
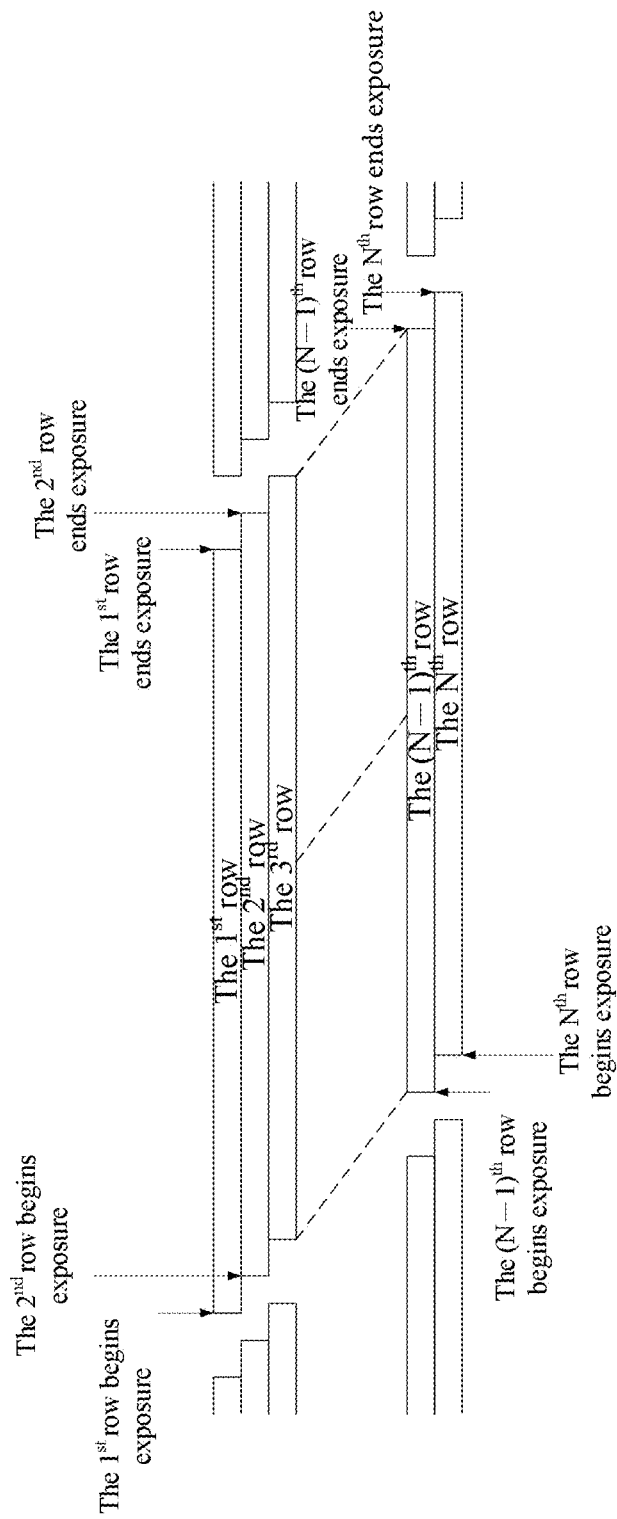
FIG. 1 is a schematic drawing of a rolling shutter in the conventional art.
Figure 2:
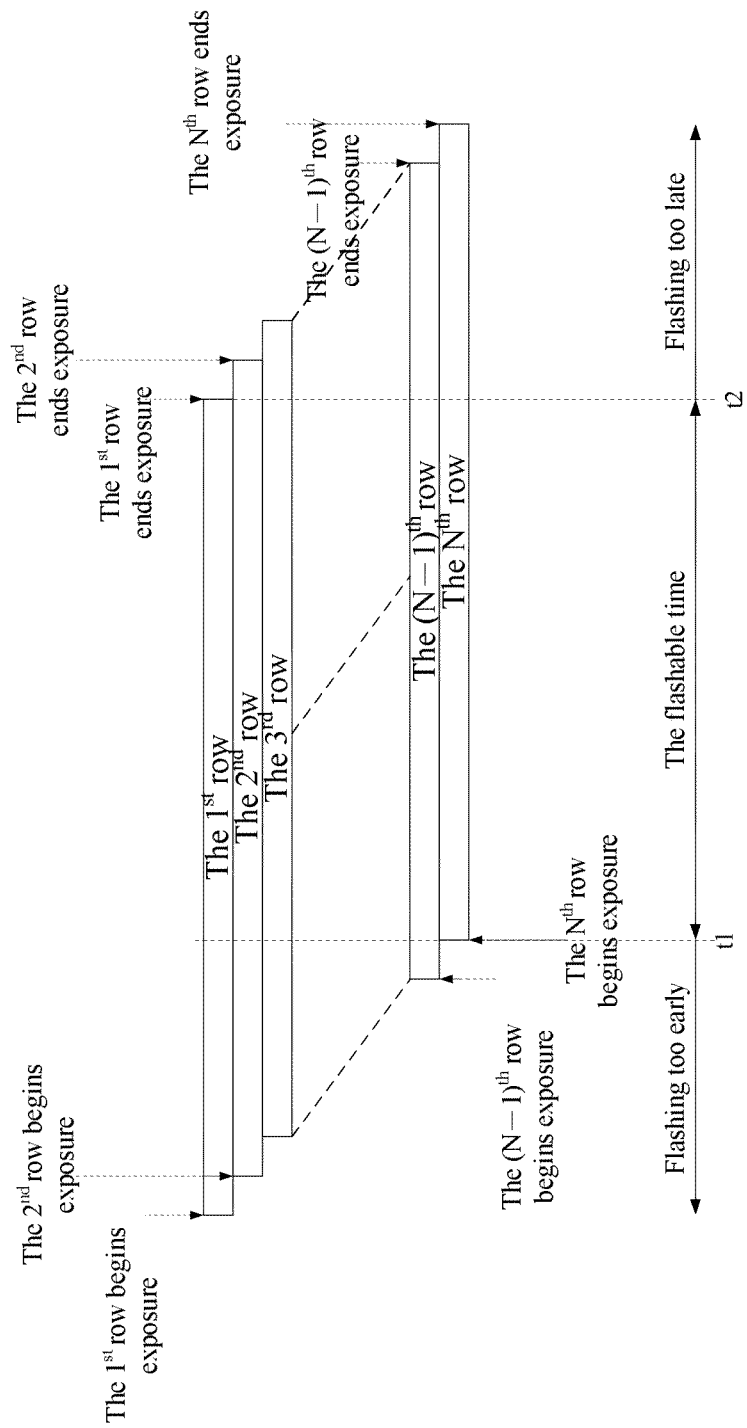
FIG. 2 is a schematic drawing of a flashable time according to an embodiment of the present invention.

FIG. 2 is a schematic drawing of a flashable time according to an embodiment of the present invention. Referring to FIG. 2, the flashable time falls only between t1 and t2. The flash light within the period can be received by every row of photo sensors. If the flash time is earlier than t1, the subsequent rows of photo sensors are not exposed. If the flash time is later than t2, the previous rows of photo sensors are not exposed. However, since mobile devices usually perform multi-tasking, the delay time between the time when a user presses the shutter thereby giving a shutter instruction and t1 or t2 is not fixed. Therefore, there is not a feasible and reliable way to ensure the flash time of the extension flash module can be stably controlled between t1 and t2, which seriously and critically compromises the function of extension HID flash modules. A method for taking photos is provided by the present invention, as shown in FIG. 2, and described below, in which the flash time of the extension flash module can be stably controlled between t1 and t2.

Figure 3:
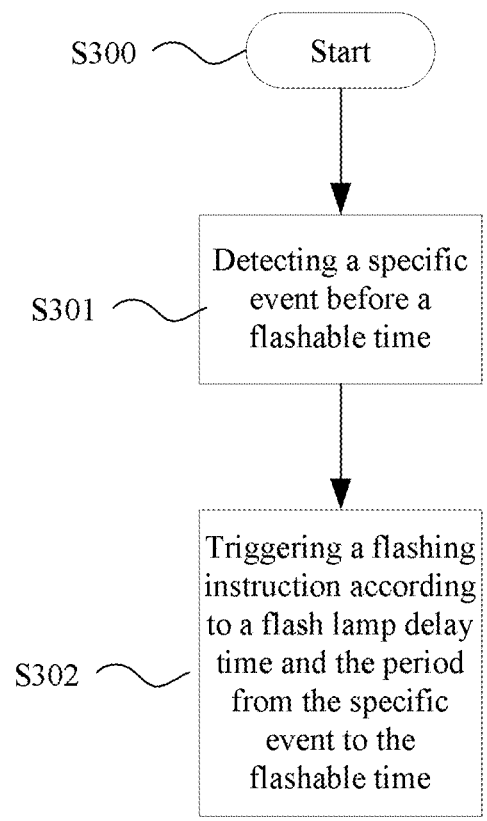
FIG. 3 shows the flow chart of a method for taking photos according to a preferred embodiment of the present invention.

FIG. 3 shows the flow chart of a method for taking photo according to a preferred embodiment of the present invention. Referring to FIG. 3, the method for taking photo adopts an extension HID flash module to fill light when the mobile device is taking a photo. The method includes the following steps:

Step S300: Start.

Step S301: Detecting a specific event before a flashable time. Referring to FIG. 2, conventionally, the image retrieval device adopted by mobile devices is said rolling shutter, which means photo sensors of the mobile device are exposed line after line in order. Moreover, every line of photo sensors in the mobile device adopts the method of integration. Hence, the flashable time as shown in FIG. 2 falls between a time t1 and a time t2 of a retrieved specific frame. As seen in FIG. 2, t1 and t2 are the period from the time at which the last row of photo sensors begins exposure (integration begun) to the time at which the first row of photo sensors ends exposure (integration ended). If the flash module flashes during the period, every scan line can sense the light by integration.

After a mobile device confirms a user has pressed the shutter giving a shutter instruction, the mobile device will begin preparation, such as performing photometry and focusing, and determine a specific frame to be retrieved and the exposure time of photo sensors. At this moment, the flashable time period t1~t2 of the extension flash module is known. For instance, a designer may predict the time of the specific frame by designing a certain application program or use signals from other hardware to determine the time of the specific frame. Therefore, the present embodiment adopts the time of a specific event as the basis for prediction. The time at which the specific event occurs is a fixed length of time compared to the flashable time, i.e. a relatively stable and known period.

Taking the implementation method of a mobile phone application program for example, the mobile phone application program can retrieve the time at which the first row of photo sensors in the specific frame as the specific event. Now, the fixed length of time is the period from the time at which the first row of photo sensors begins exposure to the time at which the last row of photo sensors begins exposure. The specific event can be the time at which the $K^{th}$ row of photo sensors in the first N frames begins exposure. Meanwhile, the fixed length of time is N frame times plus the period from the time at which the $K^{th}$ row of photo sensors begins exposure to the time at which the last row of photo sensors begins exposure. The specific event may also be the time at which the $K^{th}$ row of photo sensors in the first N frames ends exposure. The fixed length of time is N−1 frame times plus the period from the time at which the $K^{th}$ row of photo sensors begins exposure to the time at which the last row of photo sensors begins exposure.

Figure 4:
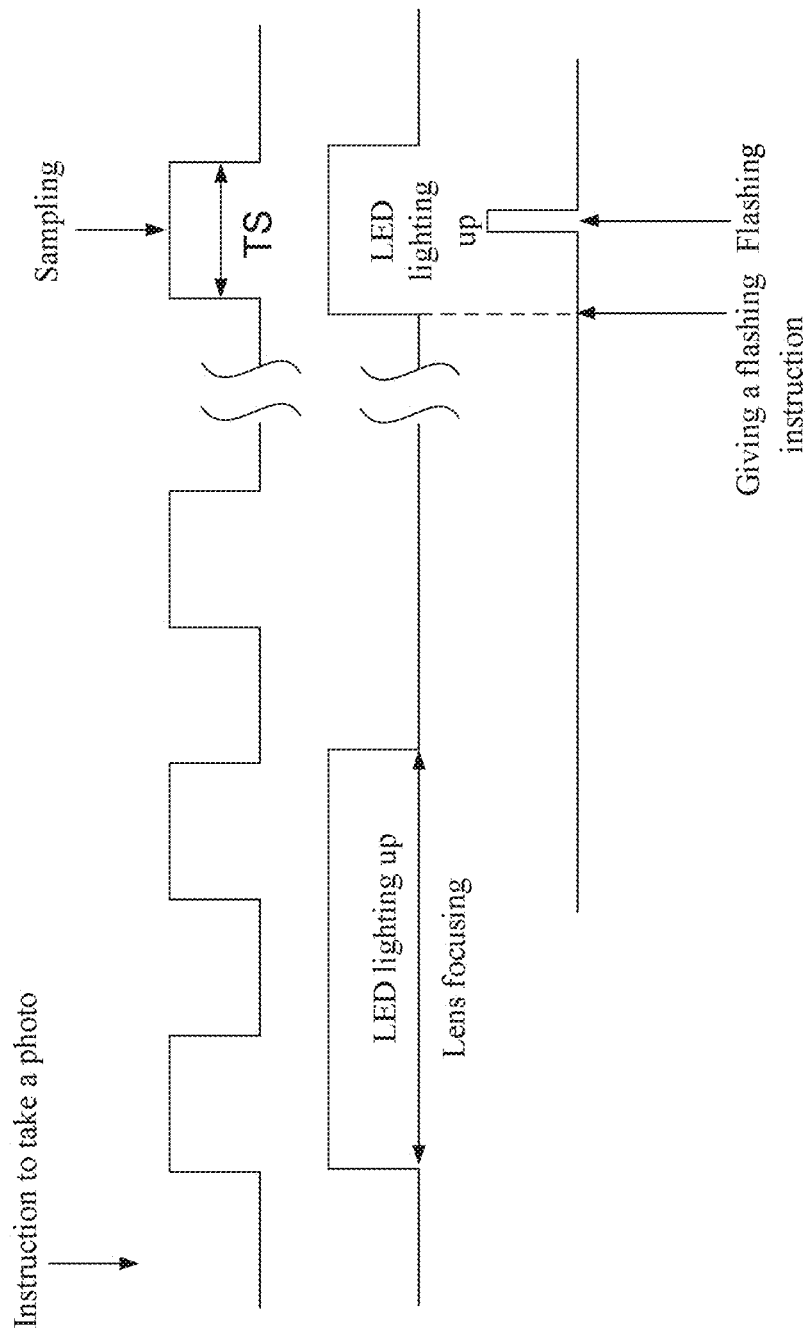
FIG. 4 shows the oscillogram of signals from a built-in LED fill light of the mobile device adopted by the method for taking photos according to a preferred embodiment of the present invention.

From the standpoint of an extension hardware, the specific event may be a signal from a built-in LED supplement lamp of the mobile device. FIG. 4 shows the oscillogram of signals from a built-in LED supplement lamp of the mobile device adopted by the method for taking photo according to a preferred embodiment of the present invention. Referring to FIG. 4, when the mobile device is taking photo, the built-in LED supplement lamp lights up for the first time to indicate the lens is focusing and lights up for the second time to show image retrieval is being performed (sensing). Therefore, in the step S301 of the present invention, the specific event may be the LED supplement lamp lighting up for the first time or for the second time.

Step S302: Triggering a flash instruction so that the extension flash module flashes during the flashable time according to a flash delay time and the period from the specific event to the flashable time. Since the flash light is an extension flash module, no matter said hardware or software is adopted, as far as controlling the extension flash module is concerned, a flash delay time td exists between triggering a flash instruction to the actual flashing. Suppose that the time at which the specific event occurs is t0, the flash time needs to fulfill the relation t1−t0<td<t2−t0. As soon as td ends, the extension flash module is instructed to flash.

Figure 5:
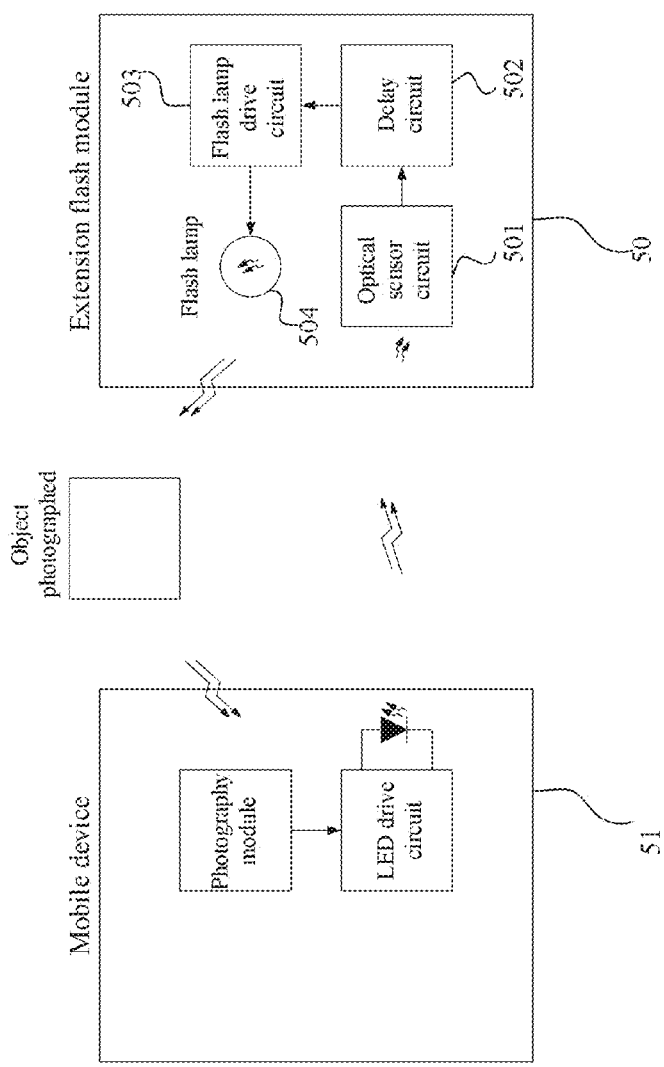
FIG. 5 shows a system block diagram of the extension flash module adopted by the method for taking photos according to a preferred embodiment of the present invention.

Connected by hardware, electrically connected via a universal serial bus (USB), or electrically coupled through a headset socket built in the mobile device, the extension flash module applies internal software of the mobile device to determine the specific event, such as starting a sensing time or giving off signals indicating an LED being lit up to proceed with flashing. However, in compliance with the spirit of the present invention, the extension flash module may also be optically coupled to implement the embodiment. FIG. 5 shows a system block diagram of the extension flash module adopted by the method according to one embodiment of the present invention. Referring to FIG. 5, an extension flash module 50 may be, for example, a non-contact extension flash module of the mobile device. The extension flash module 50 includes an optical sensor circuit 501, a delay circuit 502, a flash lamp drive circuit 503, and an HID lamp 504. Through the optical sensor circuit 501 an LED fill light of a mobile device 51 is detected as lighting up, which serves as the specific event and then triggers the HID lamp 504 to flash during the flashable time (t1~t2).

Furthermore, although said embodiment is implemented by optical coupling, people ordinarily skilled in the art should know that the present invention may also be implemented wirelessly—such as via Wi-Fi, near field communication (NFC) or Bluetooth—or coupled by the sound produced by the shutter of the mobile device. The present invention is not limited to the embodiments described herein.

Still further, generally, said specific events occur for fixed lengths of time compared to the flashable time, in other words, relatively stable and known periods of time. However, even designers themselves cannot guarantee that no errors exist in said specific events. As long as errors in the times said specific events occurring compared to the flashable time are smaller than the flashable time or smaller than half of the flashable time, they fall within the scope defined by the present invention.

In summary, the spirit of the present invention lies in utilizing a specific event and the time at which the specific event occurs being relatively stable and known compared to the flashable time. Along with controlling the delay time of the flash module, the flash module is then triggered to flash during the flashable time. Therefore, the method for taking photo provided by the present invention can render photo sensors properly exposed under the circumstances of low lighting or backlighting so that the quality of photos taken the mobile device is enhanced.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art. It will be apparent that various changes and modifications can be made without departing from the spirit and scope of the invention as defined in the appended claims.

What is claimed is:

1. A method for taking photo suitable for a mobile device, wherein
the mobile device operates in coordination with an extension flash module to achieve fill light, the method comprising:
detecting a specific event from the mobile device by the extension flash module before a flashable time, wherein the flashable time is a period from the time at which a last row of photo sensors of a specific frame begins exposure to the time at which a first row of photo sensors of the specific frame ends exposure, wherein the time at which the specific event occurs is a relatively fixed length of time compared to the flashable time, wherein the extension module is a external module out of the mobile device; and
triggering a flash instruction so that the extension flash module flashes during the flashable time according to a flash delay time and the period from the specific event to the flashable time,
wherein the flash delay time is a delay between the mobile device and the extension flash module,
wherein the delay is between triggering a flash instruction to the actual flashing, and
wherein t1−t0<td<t2−t0, where td is the flash delay time, t0 is the time when specific event occurs, t1 is the time at which a last row of photo sensors of a specific frame begins exposure, t2 is the time at which a first row of photo sensors of the specific frame ends exposure.

2. The method as claimed in claim 1, wherein the specific event comprises:
the time at which the first row of photo sensors of the specific frame begins exposure, wherein the fixed length of time is the period from the time at which the first row of photo sensors begins exposure to the time at which the last row of photo sensors begins exposure.

3. The method as claimed in claim 1, wherein the specific event comprises:
the time at which a Kth row of photo sensors of the specific frame begins exposure, the fixed length of time being the period from the time at which the Kth row of photo sensors begins exposure to the time at which the last row of photo sensors begins exposure, N and K both being natural numbers.

4. The method as claimed in claim 1, wherein the specific event comprises:
the time at which the Kth row of photo sensors in the first N frames of the specific frame begins exposure, wherein the fixed length of time is N frame times plus the period from the time at which the Kth row of photo sensors begins exposure to the time at which the last row of photo sensors begins exposure, N and K being natural numbers.

5. The method as claimed in claim 1, wherein the specific event comprises:
the time at which the Kth row of photo sensors in the first N frames of the specific frame ends exposure, wherein the fixed length of time is the first N−1 frame times plus the period from the time at which the Kth row of photo sensors begins exposure to the time at which the last row of photo sensors begins exposure, N and K being natural numbers.

6. The method as claimed in claim 1, wherein the specific event comprises:
the time at which the Kth row of photo sensors in the first N frames of the specific frame ends exposure, wherein the fixed length of time is N−1 frame times plus the period from the time at which the Kth row of photo sensors ends exposure to the time at which the last row of photo sensors beings exposure, N and K being natural numbers.

7. The method as claimed in claim 1, wherein the specific event comprises:

the time at which when a built-in LED fill light of the mobile device lights up for the first time after a user presses a shutter, wherein the extension flash module comprises a photometry module, and wherein when the photometry module in the extension flash module detects the built-in LED fill light of the mobile device begins filling light, the extension flash module triggers a flash instruction so that the extension flash module flashes during the flashable time according to a flash delay time and the period from the time at which the built-in LED fill light begins filling light to the flashable time.

8. The method as claimed in claim 1, wherein the specific event comprises:

the time at which the built-in LED fill light of the mobile device lighting up for the second time after the user presses the shutter, wherein the extension flash module comprises a photometry module, and wherein when the photometry module of the extension flash module detects the built-in LED fill light beginning to fill light for the second time, the extension flash module triggers a flash instruction so that the extension flash module flashes during the flashable time according to a flash delay time and the period from the time at which the built-in LED fill light of the mobile device begins filling light for the second time to the flashable time.

9. The method as claimed in claim 1, wherein an error of the fixed length of time is smaller than the flashable time.

10. The method as claimed in claim 1, wherein an error of the fixed length of time is smaller than half of the flashable time.

* * * * *